United States Patent [19]

Berard

[11] 4,103,604
[45] Aug. 1, 1978

[54] COOKING CONTAINER, ESPECIALLY FOR FRYING FOOD PRODUCTS

[75] Inventor: Jean Claude Berard, Saint Chamond, France

[73] Assignee: SEB S.A., Selongey, France

[21] Appl. No.: 698,717

[22] Filed: Jun. 22, 1976

[30] Foreign Application Priority Data

Feb. 24, 1976 [FR] France .................. 76 05068

[51] Int. Cl.² ........................................ A47J 37/12
[52] U.S. Cl. .................................... 99/342; 99/403
[58] Field of Search .............. 99/342, 343, 326, 331, 99/403

[56] References Cited

U.S. PATENT DOCUMENTS

| 2,219,950 | 10/1940 | Childs | 99/343 |
| 2,248,659 | 7/1941 | Childs | 99/343 |
| 2,287,396 | 6/1942 | Roth | 99/403 X |
| 2,652,725 | 9/1953 | Lamb | 99/343 X |
| 3,270,661 | 9/1966 | Juvan | 99/343 |
| 3,405,678 | 10/1968 | Frenkel et al. | 99/342 X |
| 3,734,740 | 5/1973 | Zenos | 99/342 X |
| 3,736,861 | 6/1973 | Kroyer et al. | 99/343 |

FOREIGN PATENT DOCUMENTS 280,607  4/1965  Australia .................. 99/342

Primary Examiner—Harvey C. Hornsby
Assistant Examiner—Arthur O. Henderson
Attorney, Agent, or Firm—Young & Thompson

[57] ABSTRACT

The container comprises a pan for a food-cooking bath which is intended to be placed on a boiling ring or hot-plate of a cookstove. The container essentially comprises a thermometer probe which extends vertically downwards within the vessel and is fitted with a dial, the dial being inserted in a visible manner within a handle which serves to hold the pan.

6 Claims, 7 Drawing Figures

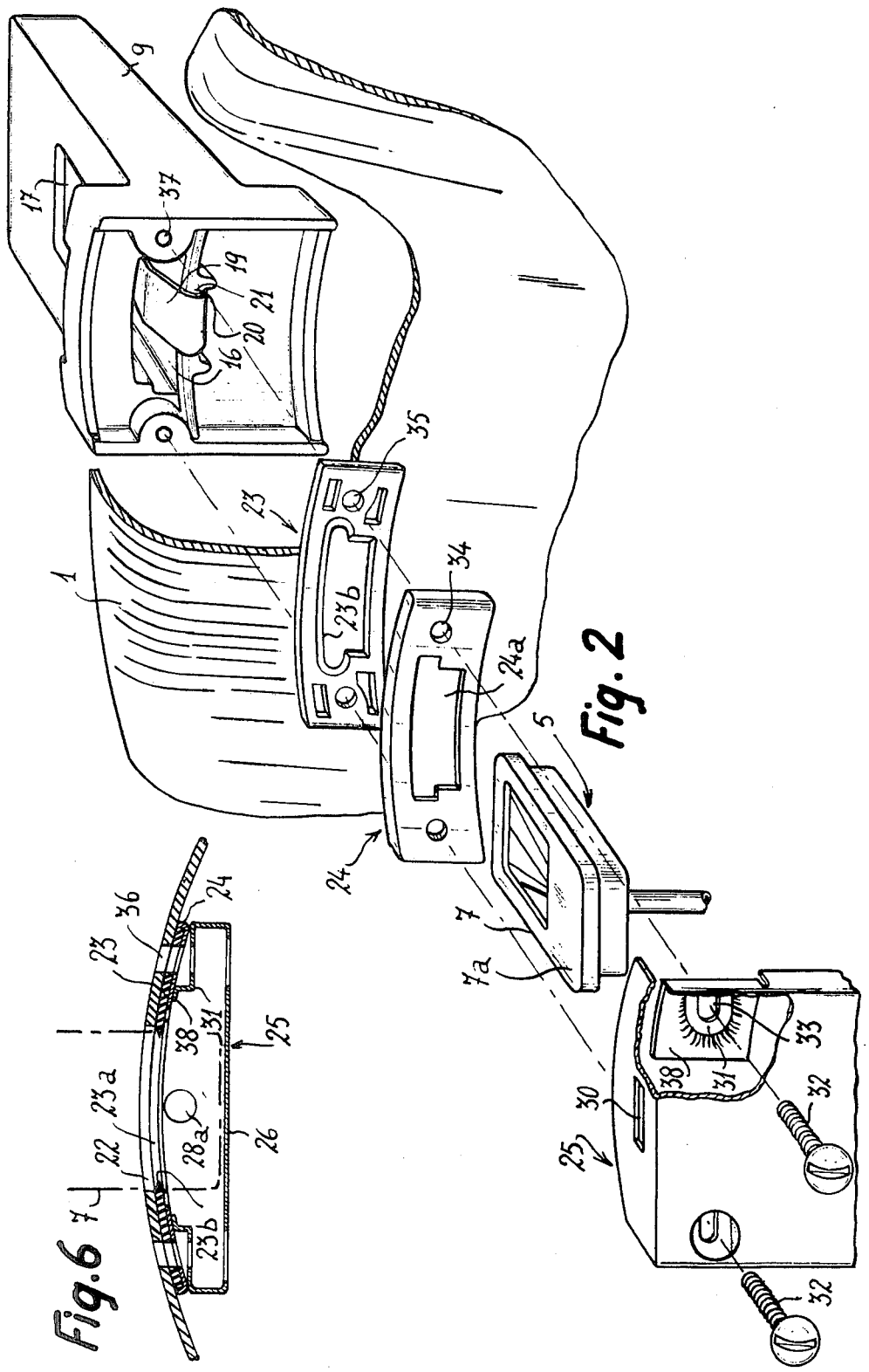

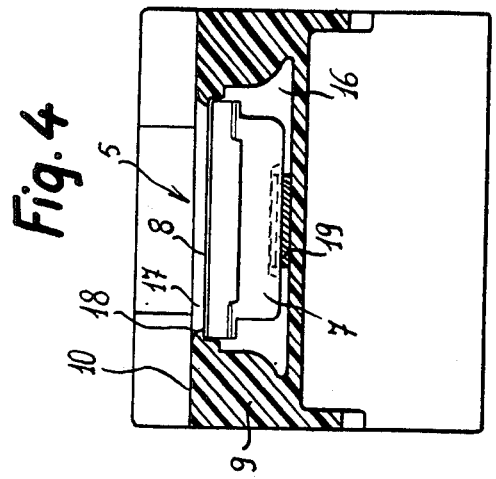
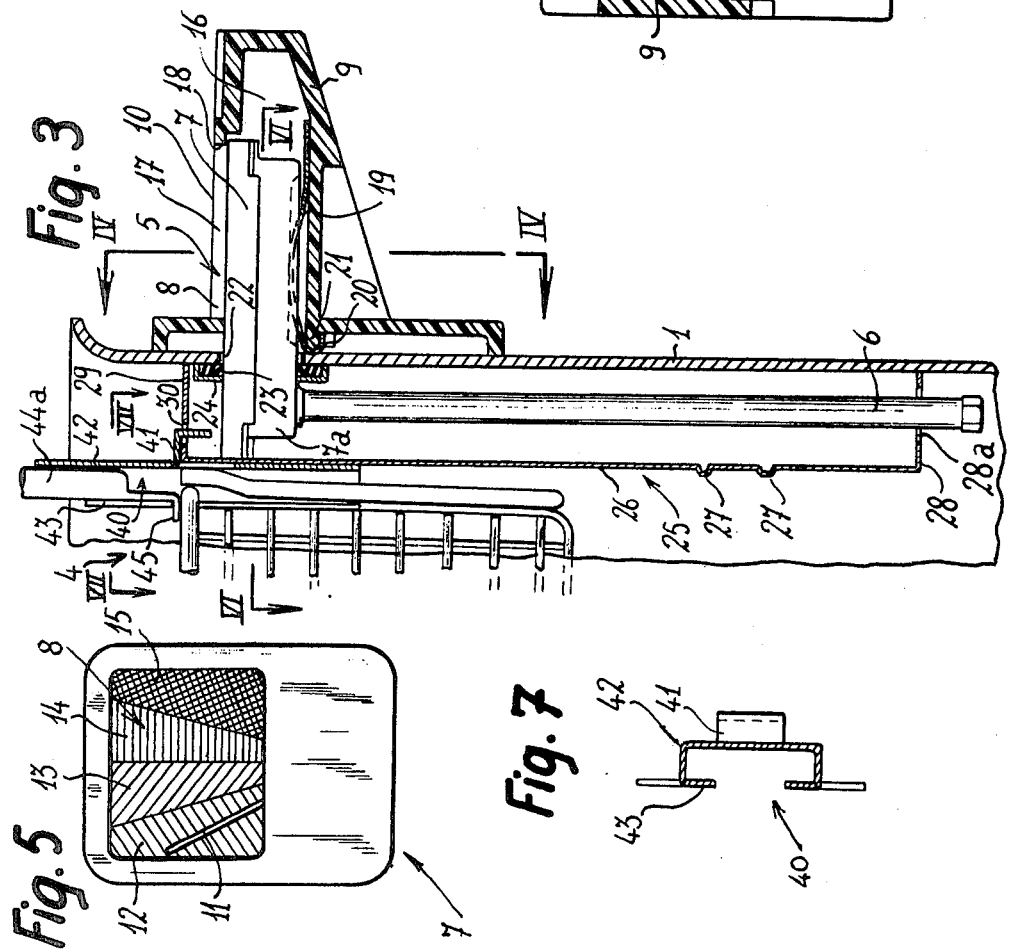
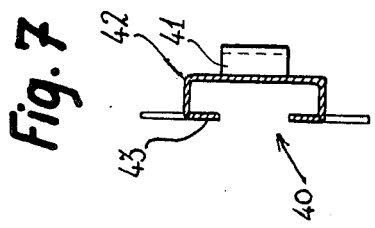

COOKING CONTAINER, ESPECIALLY FOR FRYING FOOD PRODUCTS

This invention relates to a cooking container, especially for frying food.

At the time of use, a container of this type is usually partly filled with a cooking bath consisting of oil, animal or vegetable fat or any like product. The container is heated on a boiling ring of the gas or electric type, for example, and the food products to be cooked are immersed in the bath and withdrawn at the required moment in order to obtain the degree of cooking desired.

A container of this type consists of a vessel provided with handles and fitted in the majority of designs with an open-work basket which facilitates handling of food and prevents any danger of injury by burning. Equipment of this type suffers from a disadvantage in that no provision is made for any temperature-measuring means. The user does not therefore have any guide which makes it possible to determine the precise moments at which the food must be placed in the frying bath and withdrawn therefrom. Furthermore, in the event of overheating of the bath, this latter is liable to undergo change which alters its taste and can even make it harmful.

Separate thermometers which can be introduced into the bath in order to give the necessary indications to the user are already in existence. These thermometers are often delicate, however, and hinder the operations of introduction and withdrawal of food, especially in the event that a basket of the type mentioned above is employed.

The present invention is directed to a container of the type aforesaid which is not subject to the disadvantages discussed in the foregoing and so arranged as to permit easy handling of food while making the required temperature information readily available to the user.

The cooking container in accordance with the invention comprises a vessel which is intended to contain a cooking bath for food and to be placed on a heat source, said container being distinguished by the fact that it comprises a thermometer probe extending within the vessel and fitted with a reading dial which is inserted in a visible manner in a handle for holding the vessel.

The user is thus provided with a temperature indicator which is integrated with the container and is convenient to read.

The dial is preferably provided with reference marks defining at least four temperature zones in front of which a pointer is capable of moving, namely a low-temperature zone, a zone for cooking delicate products, a zone for cooking other products such as potatoes and an overheating zone. The indications which are necessary for the preparation of food are thus synthesized in a simple manner and can be identified at a distance by the user.

In a particular embodiment of the invention, the probe comprises a casing which is flush-mounted in a removable manner within a recess of the handle and passes in leak-tight manner through a passage formed in the vessel wall, said casing being extended by a sensitive stem placed along one lateral wall of the vessel and surrounded by a shield provided with means for indicating the level of the bath. Accordingly, the container is advantageously equipped with an open-work basket for handling food, said basket being provided with a lateral hook which engages in the shield for suspending the basket above the bath.

The probe unit as a whole is thus fully protected against external shocks while remaining detachable and interchangeable. In addition, this structure makes it possible in a very simple manner to suspend the basket above the bath, for example between two cooking stages or during draining of the food.

Further characteristic features and advantages of the invention will become apparent from the description which now follows, one particular embodiment of the invention being illustrated in the accompanying drawings which are given by way of example and not in any limiting sense, and in which:

FIG. 2 is an exploded view showing the thermometer probe in the handle of the container of FIG. 1;

FIG. 3 is an enlarged fragmentary sectional view of FIG. 1 showing the handle and the thermometer probe;

FIG. 4 is a sectional view taken along line IV—IV of FIG. 3;

FIG. 5 illustrates the top face of the dial of the thermometer probe which has been withdrawn from its recess;

FIG. 6 is a fragmentary sectional view taken along line VI—VI of FIG. 3 and showing the seal between the vessel and the probe;

FIG. 7 is a sectional view taken along line VII—VII of FIG. 3 and showing the upright member of the basket.

Figure 1:
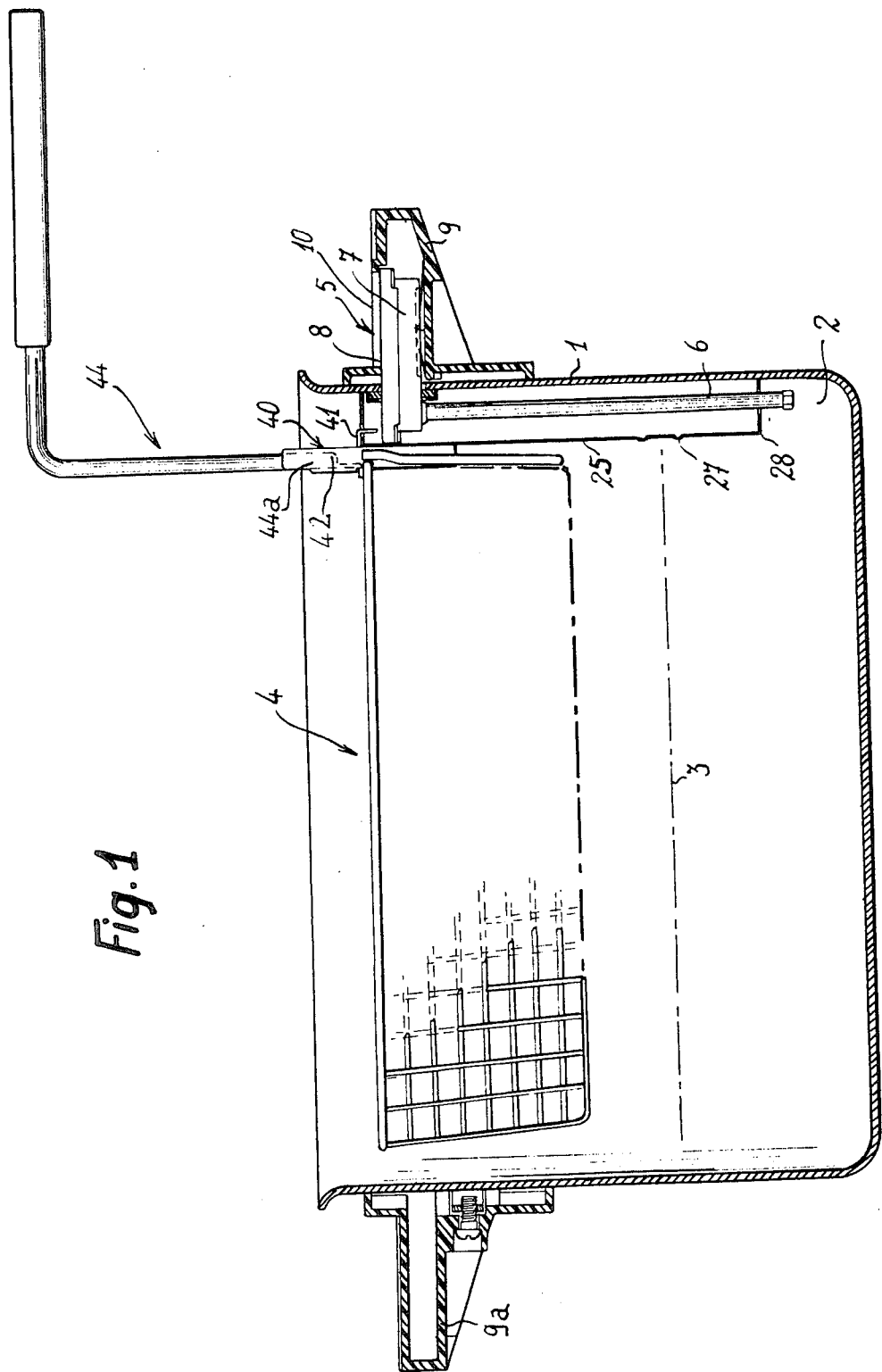
FIG. 1 is a view in diametrical sectional elevation showing the container in accordance with the invention, the basket being suspended in the draining position.

In the particular embodiment of the invention which is contemplated in the accompanying drawings, the cooking container for food products comprises a vessel 1 which is intended to contain a cooking bath 2 up to the level 3 and to be placed on a boiler ring, hot-plate or the like. Said container is fitted with an open-work basket 4 and with a thermometer probe 5 provided with a stem 6 which extends within the vessel 1 and is immersed in the bath 2. Said container further comprises a casing 7 fitted with a reading dial 8 (as shown in FIG. 5), said dial being flush-mounted in a handle 9 for holding the vessel which is symmetrical with a handle 9a of ordinary design.

The dial 8 is placed on a visible top face 10 of the handle 9, it being assumed that the container is in the service position as illustrated in the figures.

As shown in FIG. 5, the dial 8 is provided with a pointer 11 which is capable of moving in front of four sectors corresponding to four temperature zones : a sector 12 corresponding to a zone of low temperatures which are not suitable for cooking food products, a sector 13 corresponding to a zone of temperatures which are suitable for cooking delicate foods such as fish, a sector 14 for the zone of temperatures for cooking potatoes and other vegetables and a sector 15 which is attained in the event of overheating of the bath 2 which is in that case too hot for normal cooking. The sectors 12, 13, 14, 15 can be indicated in any suitable manner, namely by means of numerals, bands or else zones of different colors as shown diagrammatically in FIG. 5.

In the enlarged view of FIG. 3, it is apparent that the casing 7 is removably mounted within a recess 16 of the handle 9 and that the dial 8 is placed opposite to a window 17 surrounded by a flange 18. A flat spring 19 applies the casing 7 against the flange 18 and is in turn retained by an end hook 20 which surrounds a projection 21 of the internal face of the recess.

The casing 7 passes through an opening 22 formed in the vessel, an opening 23a provided with a chamfered lip 23b of a flexible seal 23 and an opening 24a of a cover-plate 24 which imprisons the seal 23. The casing 7 has a portion 7a which is located beyond the opening 24a and within the vessel 1.

A shield 25 surrounds the stem 6 and the portion 7a of the casing. Said shield has a substantially flat internal face 26 on which are formed two raised level-indicating ribs 27 which correspond to the maximum and minimum levels of the bath 2, a bottom face 28 which is traversed by the stem 6 at 28a and a top face 29 in which is formed a retaining slot 30. The substantially horizontal faces 28 and 29 have rounded edges adapted to the corresponding profiles of the vessel 1 and applied against these latter.

As shown in FIGS. 2 and 6, two internal lateral lugs 31 of the shield 25 serve to support two screws 32 which pass through a series of aligned holes 33, 34, 35, 36 formed respectively in the lugs 31, the cover-plate 24, the seal 23 and the vessel 1 and are engaged in nuts 37 inset in the handle 9. The lugs 31 each have a curved portion 38 applied against the cover-plate 24 as a result of the clamping force exerted by the screws 32 (FIG. 6) which maintain said cover-plate applied against the seal 23.

The basket 4 has a shape adapted to the internal profile of the vessel 1 and a depth which is substantially equal to one-half the depth of the vessel 1. Said basket has a sectional lateral upright member 40 fitted with a hook 41 which is adapted to the section of the slot 30 and placed at a height such that, when said hook is engaged in the slot 30, the basket 4 is suspended entirely above the level of the indicating ribs 27.

The upright member 40 has an extension in the form of a guide 42 in which the cross-section shown in FIG. 7 has inwardly-bent flanges 43. A detachable handle 44 has a lower portion 44a in service having a cross-section which fits within the guide 42 and terminates in a bent-back edge 45, this latter being capable of engaging beneath the flanges 43.

The device as thus constituted can be employed for example in the following manner:

The vessel 1 is filled with the cooking bath 2 up to a level between the two indicating ribs 27, whereupon the basket 4 is attached to the shield 25 by engaging the hook 41 within the slot 30. The basket 4 is then suspended above the cooking bath 2 without any need to touch the basket.

If the container is heated, the probe 5 measures the temperature rise to which the stem 6 is subjected and the pointer 11 successively sweeps the sectors 12, 13 as well as the sector 14 if so required.

When the pointer 11 has reached the sector corresponding to the temperature desired for cooking food, the basket is gripped by means of the handle 44, unhooked from the shield 25 and laid on the bottom of the vessel 1 so as to immerse the food in the bath 2.

At the end of the desired cooking period, the basket 4 is withdrawn from the vessel by means of the handle 44 and preferably maintained during the necessary period of time in the drainage position, in which said basket is hooked onto the shield 25. During this draining period, the food products remain subjected to the heat of the bath 2.

However, it is usually found preferable to carry out a second cooking stage in order to "brown" the cooked food more thoroughly. The first immersion time is therefore shorter. At the end of this time interval, the basket 4 is again hooked onto the shield 25 in the stand-by position by means of the handle 44 without removing the container from the boiler ring or hot-plate.

When the bath has reverted to its initial temperature, the food products are again immersed for a second time for a period which is usually shorter than the first.

In order to fry potatoes, for example, time intervals of seven and five minutes can advantageously be adopted respectively for the two cooking periods. The initial temperature in the case of each of these two periods can be selected from the temperature zone corresponding to the sector 14 of the dial 8, the limits of which correspond respectively to 170° and 185° C approximately.

The device in accordance with the invention thus makes it possible to carry out a cooking operation which is exactly in accordance with the user's tastes under particularly simple and practical conditions.

Moreover, the reading of the thermometer dial is particularly convenient and permits easy control of the cooking process even at a distance, this being achieved by means of the different sectors of the dial 8.

The recess of the casing 7 within the handle 9 ensures excellent protection of this latter against shocks without in any way modifying either the overall size or the attractive appearance of the container.

Moreover, the structure adopted is particularly simple since the shield 25 performs a triple function by making it possible at the same time to protect the probe, to attach the basket 4 in a non-immersed position and to indicate the level limits by means of the indicating ribs 27.

In the event of an accident resulting in damage to the probe 5, this latter can readily be demounted and replaced by a new probe. By withdrawing the screws 25 and freeing the shield 25, the casing 7 can readily be reached and drawn towards the interior of the vessel 1 and thus extracted from the recess 16.

The invention is not limited to the embodiment hereinabove described and may accordingly be extended to many alternative forms of construction. In particular, the divisions of the dial 8 can be different from those which have been described and permit other forms of cooking.

The shield 25 can also be rigidly fixed to the probe 5 and the mode of attachment of the basket 4 in the top position can be directly dependent on the wall of the vessel 1.

We claim:

1. A cooking container especially for frying food comprising a vessel which is intended to contain a cooking bath and to be placed on a heat source, said vessel has a handle and comprises a thermometer probe extending within said vessel and fitted with a reading dial which is inserted in a visible manner in said handle for holding said vessel, said probe comprising a casing which is flush-mounted in a removable manner within a recess of the handle, a temperature-sensitive stem extending from said casing and located inside the vessel along a lateral wall of said vessel, said casing passing through a passage formed in the vessel wall, sealing means sealing said casing in a leak-tight manner in said passage, a seal within the interior of the vessel surrounding said passage, a cover plate covering said seal within the interior of the vessel, the seal having a flexible lip which is adapted to the contours of the casing, and at least one fixing screw by which the cover plate is attached to the handle.

2. A cooking container especially for frying food comprising a vessel which is intended to contain a cooking bath and to be placed on a heat source, said vessel has a handle and comprises a thermometer probe extending within said vessel and fitted with a reading dial which is inserted in a visible manner in said handle for holding said vessel, said probe comprising a casing which is flush-mounted in a removable manner within a recess of the handle, a temperature-sensitive stem extending from said casing and located inside the vessel along a lateral wall of said vessel, said casing passing through a passage formed in the vessel wall, sealing means sealing said casing in a leak-tight manner in said passage, said recess of the casing having a window provided with a flange surrounding the dial, and a flat spring attached at one end to the handle and disposed between the recess and the casing so as tightly to apply the dial against said flange.

3. A cooking container especially for frying food comprising a vessel which is intended to contain a cooking bath and to be placed on a heat source, said vessel has a handle and comprises a thermometer probe extending within said vessel and fitted with a reading dial which is inserted in a visible manner in said handle for holding said vessel, said probe comprising a casing which is flush-mounted in a removable manner within a recess of the handle, a temperature-sensitive stem extending from said casing and located inside the vessel along a lateral wall of said vessel, said casing passing through a passage formed in the vessel wall, sealing means sealing said casing in a leak-tight manner in said passage, a shield surrounding the stem of the probe, and at least one fixing screw for securing the handle to the vessel, said fixing screw also attaching said shield to the vessel, said shield having at the lower portion thereof in the service position an opening through which the stem of the probe passes.

4. A container according to claim 3, and means on the shield for indicating the level of the bath.

5. A container according to claim 3, and an openwork basket for immersing food in said vessel, said basket having means for hooking it onto said shield.

6. A container according to claim 5, and a detachable handle on said basket.

* * * * *